United States Patent [19]

Bougher

[11] Patent Number: 4,876,770
[45] Date of Patent: Oct. 31, 1989

[54] ANTI-CREEP CAM BAR
[75] Inventor: Jerry D. Bougher, Lebanon, Ind.
[73] Assignee: Indiana Mills & Manufacturing, Inc., Westfield, Ind.
[21] Appl. No.: 252,151
[22] Filed: Oct. 3, 1988
[51] Int. Cl.[4] .............................................. A44B 11/12
[52] U.S. Cl. ........................................ 24/170; 24/196
[58] Field of Search ................. 24/170, 191, 196, 171, 24/68 CD, 585, 635

[56] References Cited

U.S. PATENT DOCUMENTS

| D. 296,678 | 7/1988 | Lortz et al. | |
| 950,434 | 2/1910 | Carlson | 24/170 |
| 2,598,369 | 5/1952 | Grandi | 24/170 |
| 3,013,317 | 12/1961 | Weber | 24/170 |
| 3,169,291 | 2/1965 | Stacherl | 24/196 |
| 3,226,791 | 1/1966 | Carter | 24/196 |
| 3,686,715 | 8/1972 | Brodnicki | 24/170 |
| 3,872,550 | 3/1975 | Yang | 24/170 |
| 4,184,234 | 1/1980 | Anthony et al. | |
| 4,366,604 | 1/1983 | Anthony et al. | |
| 4,718,148 | 1/1988 | McKernon et al. | 24/170 |

Primary Examiner—Victor N. Sakran
Attorney, Agent, or Firm—Woodard, Emhart, Naughton, Moriarty & McNett

[57] ABSTRACT

An anti-creep bar for holding a web. A seat belt buckle or tongue has a pivotally cam bar which receives a seat belt or web. The cam bar is positioned adjacent a web stop and pinches the web therebetween when in the locked position. A pair of wire springs urge the cam bar to the locked position, but are yieldable to allow the cam bar to pivot away from the web stop when the free end of the web is pulled outwardly.

20 Claims, 2 Drawing Sheets

ANTI-CREEP CAM BAR

BACKGROUND OF THE INVENTION

1. Field of the Invention:

This invention is in the field of seat belt buckles and tongues, and more specifically, a device utilized to affix a web to a frame and which prevents the web from uncontrollably moving relative to the frame.

2. Description of the Prior Art:

Seat belt buckles and tongues are attached to webs having their opposite ends fixedly mounted to the vehicle frame. In order to allow use by different sized occupants, the web is adjustably movable with respect to either the buckle or tongue. This is typically accomplished by providing a movably mounted bar on the buckle and/or tongue with the web then moving around the bar. A web stop formed on the frame and extending the length of the bar prevents relative motion between the web and bar when the bar is forced against the web stop.

Due to the uneven ride of the vehicle, the occupant is jostled causing the web force applied to the bar to be varied. As a result, the web has a tendency to creep relative to the bar changing the initial adjustment of the seat belt buckle or tongue relative to the web. A number of means have been provided to prevent relative motion between the web and the bar. For example, in the commonly owned U.S. Design Pat. No. 296,678, a pivoting cam is shown which forces the web against the bar limiting relative motion therebetween. Another approach is shown in the commonly owned U.S. Pat. No. 4,184,234 wherein a pair of springs normally urge the web bar towards the web stop. The web bar disclosed in the aforementioned patent has a cylindrical configuration and is slidably movable in a straight line to and from the web stop. Many web bars do not have a cylindrical configuration nor move in a straight line to and from the web stop. For example, in the commonly owned U.S. Pat. No. 4,366,604, the web bar may be moved along two different angular directions depending upon whether the bar is in the locked or unlocked position.

As previously mentioned, the web bar does not always assume a cylindrical configuration and in some instances, has a cam shape to pinch the web against the web stop, such as shown by the prior art tongue and cam bar in FIG. 6. In such a case, the cam shaped web bar is mounted off center, but is pivotable about a fixed axis. Thus, the prior springs and devices disclosed in the aforementioned patents are not applicable to controllably hold the web bar in the locked position. Disclosed herein is a structure to accomplish this objective.

As the occupant is jostled, the web force applied to the bar by the web in a direction from the fixed end of the web towards the bar is varied and in certain cases, the web will actually move away from at least a portion of the bar. Assuming the bar is not forced tightly against the web stop trapping the web therebetween, the web may walk around or creep relative to the bar. The structure disclosed herein includes spring means to ensure the bar is forced against the web stop with the web therebetween even though the web force from the fixed web end is lessened. On the other hand, it is still necessary to allow the web to be controllably moved relative to the bar. The spring means disclosed herein is operable to allow the bar to pivot away from the web stop when force is applied to the free distal end of the web by the occupant.

SUMMARY OF THE INVENTION

One embodiment of the present invention is an anti-creep bar for use with a web comprising a web having a fixedly mountable proximal end and a free distal end, a frame including mounting means and a web stop, a bar movably mounted by the mounting means to the frame and having a locked position for holding the web tight to the frame and an unlocked position to allow the web to move around the bar and relative to the frame, the bar in the locked position applying pinching force to lock the web between the bar and the web stop, and, a spring extending between the frame and the bar and operable to normally urge the bar to the locked position but yieldable to allow the bar to controllably move to the unlocked position, the spring further operable to maintain the bar in the locked position even though the web momentarily loosens on the bar as web force from the proximal end to the bar is varied and until web force from the the distal end to the bar moves the web and moves the bar away from the web stop.

Another embodiment of the present invention is a seat belt device comprising a roller bar with opposite ends, a frame with a pair of apertures, the roller bar with the opposite ends being movably mounted in the apertures, the frame also having a slot with a web stop extending adjacent the slot and parallel to the bar, a web extending at least partially around the bar, a spring mounted on the frame operable to limit motion of the bar and to position and releasably hold the web against the web stop limiting relative motion between the bar and the web, the spring further operable to maintain the bar in a locked position even though the web momentarily loosens on the bar as web force from the proximal end to the bar is varied and until web force from the the distal end to the bar moves the web and the bar away from the web stop, a first holder on the frame and receiving the spring and being operable to retain the spring on the frame, and, a second holder on the bar and receiving the spring and being operable to retain the spring on the bar.

It is an object of the present invention to provide a new and improved anti-creep bar.

A further object of the present invention is to provide an improved seat belt tongue and/or buckle having means to control relative movement of the web with respect thereto.

An additional object of the present invention is to provide means to prevent a web from walking around or creeping relative to a bar upon which the web is mounted.

Related objects and advantages of the present invention will be apparent from the following description.

DESCRIPTION OF THE PREFERRED EMBODIMENTS

Figure 1:
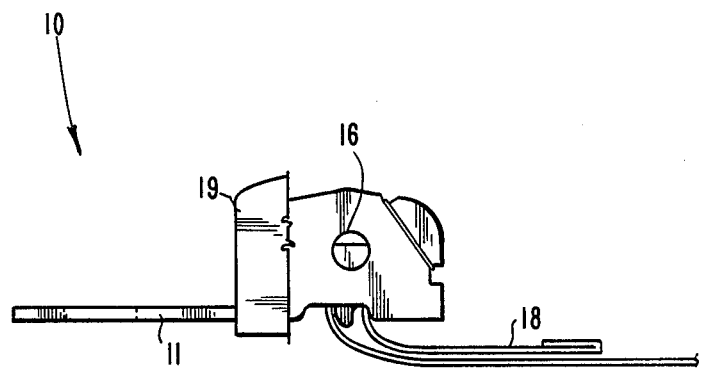
FIG. 1 is a fragmentary side view of a seat belt buckle tongue incorporating the preferred embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
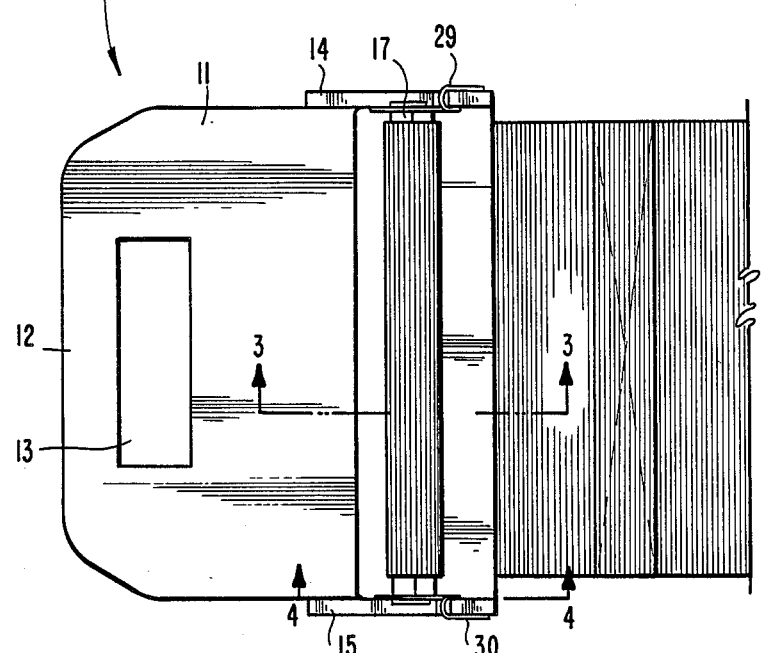
FIG. 2 is a top view of the tongue of FIG. 1.

Referring now more particularly to FIGS. 1 and 2, there is shown a seat belt buckle tongue 10 having a flat tongue shaped main body 11 tapered at end 12 and including a slot 13 through which a pawl may extend when the tongue is inserted into a conventional seat belt buckle. A pair of parallel upstanding brackets 14 and 15 are integrally connected to the tongue and include a pair of aligned apertures 16 through which web bar 17 extends thereby being pivotally mounted to the upstanding brackets. A conventional seat belt or web 18 extends through the bottom of the tongue and mountingly around bar 17. A housing 19, shown in fragments, is removably mounted to brackets 14 and 15 in order to enclose both brackets, bar 17 and that portion of the web extending around the bar.

Figure 3:
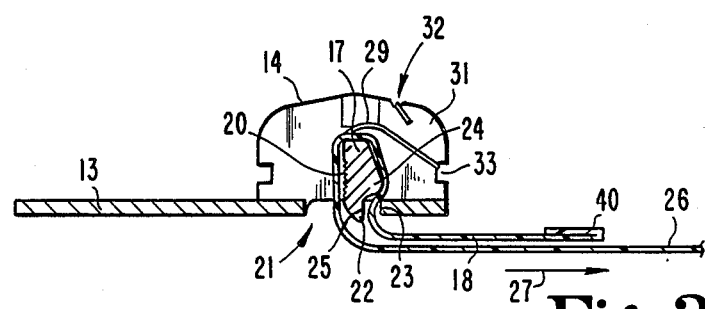
FIG. 3 is a cross-sectional view taken along line 3—3 of FIG. 2 and viewed in the direction of the arrows.
Figure 7:
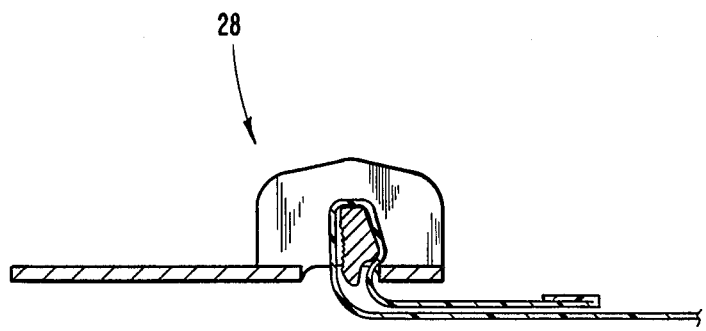
FIG. 7 is the same view as FIG. 3 showing the prior art device, but without the improved means or springs for urging the cam toward the web stop.

Web bar 17 has a forward facing serrated surface 20 which extends generally in a vertical plane when the cam bar is in the locked position depicted in FIG. 3 pinching the web 18 between the bar and the tongue frame. The bottom of tongue 13 includes a slot 21 through which the pointed bottom end 22 of bar 17 along with web 18 extend. The rear edge of slot 21 forms a web stop 23 which extends across the tongue frame between upstanding brackets 14 and 15. A rear lip 24 is provided on bar 17 and is blended by a vertical surface 25 into the bottom pointed end 22 of the bar. The bar slopes upwardly from lip 24 to a horizontal surface leading to serrated surface 20. In the fully locked position as shown in FIG. 3, both vertical surface 25 and lip 24 are spaced from web stop 23 a distance slightly less than the thickness of web 18. End 26 of web 18 is fixedly mounted or attached to the vehicle. By applying force to end 26 in the direction of arrow 27, the bar is caused to rotate to its most counter-clockwise position (FIG. 3) forcing lip 24 to move over web stop 23 pinching and locking the web therebetween. This structure is completely known in the prior art as shown by the identically constructed structure 28 in FIG. 7 with the exception that a pair of wire springs have been added to the structure in my invention to ensure the bar does not accidentally move to the unlocked position.

I have added a pair of wire springs 29 and 30 (FIG. 2) which are mounted respectively to upstanding brackets 14 and 15 and also to the opposite ends of cam bar 17 to normally urge the cam to the most counter-clockwise position or the locked position as shown in FIG. 3. Both wire springs are yieldable to allow controlled pivotal motion in a clockwise direction as viewed in FIG. 3 thereby moving lip 24 forward of web stop 23 and unlocking the web relative to the bar and tongue frame and allowing relative motion therebetween.

Wire spring 29 and upstanding bracket 14 will now be described, it being understood that a similar description applies to wire spring 30 and upstanding brackets 15. Bracket 14 has a top rearwardly located ear 31 having adjacent thereto a pair of notches 32 and 33. One end of wire spring 29 (FIG. 3) extends through each notch and wraps around ear 31 thereby mounting the wire spring to the upstanding bracket. Spring 29 extends curvingly upward from notch 33 adjacent but inward of bracket 14 to extend over cam bar 17 and in front of serrated surface 20.

Figure 4:
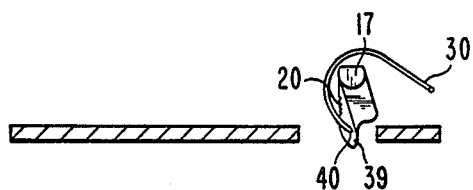
FIG. 4 is a cross-sectional view taken along line 4—4 of FIG. 2 and viewed in the direction of the arrows.
Figure 5:
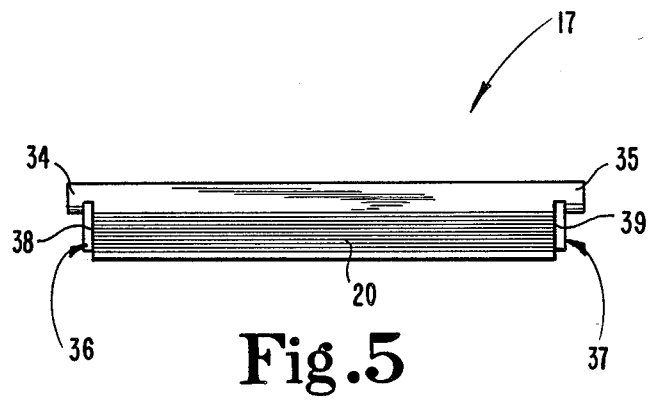
FIG. 5 is a front view of the cam bar mounted to the upstanding brackets.

Cam bar 17 has a pair of forwardly opening recesses 36 and 37 (FIG. 5) formed in the serrated surface 20 respectively adjacent ends 34 and 35 in turn pivotally mounted respectively to upstanding brackets 14 and 15. Side surfaces 38 and 39 parallel respectively to upstanding brackets 14 and 15 are arranged perpendicularly relative to the serrated surface 20 and include a pair of holes to receive the lower ends of wire springs 29 and 30 (FIG. 5). For example, side surface 39 of cam bar 17 includes a hole 40 (FIG. 4) which lockingly receives the bottom end of wire spring 30 at a location immediately beneath the axis of pivotal motion of cam bar 17. Likewise, the bottom end of wire spring 29 mounts in a hole provided in side surface 38.

The opposite ends 34 and 35 of the cam bar are reduced in size to fit through apertures 16 formed in upstanding brackets 14 and 15. The pair of wire springs extending adjacent the frame and bar 17 are operable to normally urge the bar to the locked position as shown in FIG. 3, but are yieldable to allow the bar to controllably move to the unlocked position which would require clockwise motion of the bar from the locked position of FIG. 3. The two wire springs maintain the bar in the locked position even though the web momentarily loosens on the bar as the web force from the proximal end 26 (FIG. 3) is varied. That is, as the passenger is jostled due to an uneven ride, the force applied by the web from the fixed end 26 to bar 17 will vary and in certain cases will cause the web to move apart from the serrated surface 20. In such a case, the wire springs continue to urge the bar to the locked position insuring that the web is pinched between the bar and web stop 23. On the other hand, in the event the occupant desires to adjust the position of the web relative to the web stop and pulls the free distal end 40 of the web in the direction of arrow 27, then the web will apply clockwise force to the bar as viewed in FIG. 3 thereby pivoting the bar away from the web stop.

Figure 6:
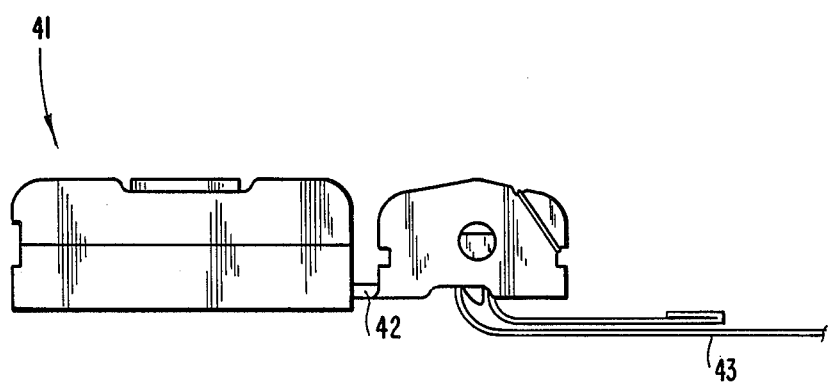
FIG. 6 is a side view of a seat belt buckle incorporating an alternate embodiment of the present invention.

The cam bar in conjunction with the pair of spring wires and belt may also be utilized with a seat belt buckle in lieu of a seat belt tongue. Buckle 41 (FIG. 6) is of conventional design with the exception that the frame 42 of the buckle extends rearwardly thereof and has a pair of upstanding brackets identical to brackets 14 and 15 which in turn have a pair of wire springs identical to springs 29 and 30 for securing a cam bar in turn identical to cam bar 17. Thus, the web 43 of the device may be urged to the locked position by the spring wires in a manner identical to that described for tongue 10. The operation and construction of the means attached to the buckle for receiving the web are identical to the means for receiving web 18 attached to tongue 10.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A seat belt device comprising:
   a web having a fixedly mountable proximal end and a free distal end;
   a frame including mounting means and a web stop;
   a bar movably mounted by said mounting means to said frame and having a locked position for holding said web tight to said frame and an unlocked position to allow said web to move around said bar and relative to said frame, said bar in said locked position applying pinching force to lock said web between said bar and said web stop; and,
   spring means located on said bar laterally outward of said web extending between and received by said frame and said bar, said spring means operable to normally urge said bar to said locked position but yieldable to allow said bar to controllably move to said unlocked position, said spring means further operable to maintain said bar in said locked position even though said web momentarily loosens on said bar as web force from said proximal end to said bar is varied and until web force from said distal end to said bar moves said web and moves said bar away from said web stop.

2. The seat belt device of claim 2 wherein:
   said spring means includes a pair of separate springs mounted to said frame and to said bar.

3. The seat belt device of claim 2 wherein:
   said frame includes a pair of upstanding brackets with first holding means formed on said pair of upstanding brackets;
   said bar includes said second holding means formed thereon; and,
   said separate springs are wire springs mounted to said first holding means on said upstanding brackets and to second holding means on said bar, said wire springs extend at least partially around said bar being operable to yield and allow pivotal motion of said bar away from said web stop.

4. The seat belt device of claim 3 wherein:
   said bar includes opposite ends positioned adjacent said upstanding brackets with said wire springs mounted to each of said upstanding brackets and said opposite ends.

5. The seat belt device of claim 4 wherein:
   said opposite ends each include a hole mountingly receiving said wire springs which extend curlingly from said first holding means in a direction away from said web stop and partially around said bar back toward said web stop causing force to be applied to said bar moving said bar toward said web stop.

6. The seat belt device of claim 5 wherein:
   said bar is mounted off-center to said upstanding bracket and is positioned adjacent to said web stop when in said locked position pinching said web against said web stop but positioned away from said web stop when in said unlocked position allowing relative motion between said web and said web stop.

7. The seat belt device of claim 6 wherein:
   said first holding means includes a pair of ears formed on said upstanding brackets around which said wire springs are mountingly wrapped.

8. The seat belt device of claim 7 wherein:
   said frame is a seat belt buckle frame.

9. The seat belt device of claim 7 wherein:
   said frame is a seat belt buckle tongue frame.

10. The seat belt device of claim 7 and further comprising:
    a housing mounted to said upstanding brackets and enclosing said bar and said wire springs.

11. The seat belt device of claim 7 wherein:
    said bar has a web gripping edge adjacent said web stop and further has a pair of slots formed at said opposite ends between said upstanding brackets and said web gripping edge, said wire springs extend through said slots into said hole at each of said opposite ends.

12. A seat belt device comprising:
    a roller bar with opposite ends;
    a frame with a pair of apertures, said roller bar with said opposite ends being movably mounted in said apertures, said frame also having a slot with a web stop extending adjacent said slot and parallel to said bar;
    a web extending at least partially around said bar;
    spring means located on said bar laterally outward of said web, mounted on said frame and received by said bar, said spring means operable to limit motion of said bar and to position and releasably hold said web against said web stop limiting relative motion between said bar and said web, said spring means further operable to maintain said bar in a locked position even though said web momentarily loosens on said bar as web force from said proximal end to said bar is varied and until web force from said said distal end to said bar moves said web and said bar away from said web stop; operable to retain said spring means on said frame; and,
    second holding means on said bar and receiving said spring means and being operable to retain said spring means on said bar.

13. The seat belt device of claim 12 wherein:
    said spring means includes a pair of springs located on said bar laterally outward of said web, mounted to said frame and received by said bar.

14. The seat belt device of claim 13 wherein:
    said first holding means including stop surfaces formed on said upstanding brackets;
    said second holding means includes a pair of holes on opposite ends of said bar; and,
    said springs are wire springs mounted to said stop surfaces on said upstanding brackets and to said holes on said bar and extend at least partially around said bar being operable to apply force to said bar toward said web stop but operable to allow pivotal motion of said bar away from said web stop.

15. The seat belt device of claim 14 wherein:
    said wire springs extend curlingly from said first holding means in a direction away from said web stop and partially around said bar back toward said web stop causing force to be applied to said bar moving said bar toward said web stop.

16. The seat belt device of claim 15 wherein:
    said bar is mounted off-center to said upstanding bracket and is positioned adjacent to said web stop when in said locked position pinching said web against said web stop but positioned away from said web stop when in said unlocked position allowing relative motion between said web and said web stop.

17. The seat belt device of claim 16 wherein:
said first holding means includes a pair of ears formed on said upstanding brackets around which said wire springs are mountingly wrapped.

18. The seat belt device of claim 17 wherein:
said frame is a seat belt buckle frame.

19. The seat belt device of claim 17 wherein:
said frame is a seat belt buckle tongue frame.

20. The seat belt device of claim 17 wherein:
said bar has a web gripping edge adjacent said web stop and further has a pair of slots formed at said opposite ends between said upstanding brackets and said web gripping edge, said wire springs extend through said slots into said holes at each of said opposite ends.

* * * * *

UNITED STATES PATENT AND TRADEMARK OFFICE
CERTIFICATE OF CORRECTION

PATENT NO. : 4,876,770

DATED : October 31, 1989

INVENTOR(S) : Jerry D. Bougher

It is certified that error appears in the above-identified patent and that said Letters Patent is hereby corrected as shown below:

In column 5, line 31, please delete "claim 2" and substitute therefor --claim 1--.

Signed and Sealed this

Thirteenth Day of November, 1990

Attest:

HARRY F. MANBECK, JR.

*Attesting Officer*　　　　*Commissioner of Patents and Trademarks*